US009755453B2

(12) United States Patent
Kanai et al.

(10) Patent No.: US 9,755,453 B2
(45) Date of Patent: Sep. 5, 2017

(54) CELL CONTROLLER AND BATTERY-MONITORING DEVICE

(71) Applicant: Hitachi Automotive Systems, Ltd., Hitachinaka-shi, Ibaraki (JP)

(72) Inventors: Tomonori Kanai, Hitachinaka (JP); Akihiko Kudoh, Hitachinaka (JP); Hikaru Miura, Hitachinaka (JP); Mitsuo Noda, Hitachinaka (JP); Mutsumi Kikuchi, Hitachinaka (JP)

(73) Assignee: HITACHI AUTOMOTIVE SYSTEMS, LTD., Ibaraki (JP)

( * ) Notice: Subject to any disclaimer, the term of this patent is extended or adjusted under 35 U.S.C. 154(b) by 181 days.

(21) Appl. No.: 14/758,051

(22) PCT Filed: Jan. 25, 2013

(86) PCT No.: PCT/JP2013/051614
§ 371 (c)(1),
(2) Date: Jun. 26, 2015

(87) PCT Pub. No.: WO2014/115310
PCT Pub. Date: Jul. 31, 2014

(65) Prior Publication Data
US 2015/0340883 A1    Nov. 26, 2015

(51) Int. Cl.
*H02J 7/00* (2006.01)
*H02J 7/04* (2006.01)
(Continued)

(52) U.S. Cl.
CPC ........... *H02J 7/007* (2013.01); *H01M 10/482* (2013.01); *H02J 7/0016* (2013.01); *H02J 7/0021* (2013.01);
(Continued)

(58) Field of Classification Search
CPC ...... H02J 7/0016; H02J 7/0019; H02J 7/0018; G01R 31/3658; B60L 11/1866
(Continued)

(56) References Cited

U.S. PATENT DOCUMENTS 5,666,040 A * 9/1997 Bourbeau ............. H01M 2/348
320/118
5,818,201 A * 10/1998 Stockstad ............. H02J 7/0016
320/116
(Continued)

FOREIGN PATENT DOCUMENTS

JP    2003-009411 A    1/2003
JP    2003-282159 A    10/2003
(Continued)

OTHER PUBLICATIONS

Extended European Search Report issued Aug. 31, 2016. European Patent Application No. 13872802.7.

*Primary Examiner* — Samuel Berhanu
*Assistant Examiner* — Tarikh Rankine
(74) *Attorney, Agent, or Firm* — Volpe and Koenig, P.C.

(57) ABSTRACT

A cell controller in a battery-monitoring device that monitors an assembled battery having a single cell group or a plurality of cell groups, each made up with a plurality of battery cells connected in series, includes: a startup terminal to which a first discharge resistor is connected and a startup voltage is applied; and a cell-balancing unit that executes cell balancing operation in order to adjust charge levels of the plurality of battery cells during a time period through which the startup voltage remains equal to or greater than a predetermined voltage, wherein: the startup voltage is applied for a predetermined length of time by a first timer
(Continued)

unit that includes a passive element capable of accumulating electric energy and capable of discharging electric energy to the startup terminal.

8 Claims, 12 Drawing Sheets

(51) Int. Cl.
  *H01M 10/48* (2006.01)
  *H01M 10/42* (2006.01)
(52) U.S. Cl.
  CPC  *H01M 2010/4271* (2013.01); *H01M 2220/20* (2013.01); *H02J 7/0026* (2013.01); *Y02T 10/7005* (2013.01); *Y02T 10/7055* (2013.01); *Y02T 10/7061* (2013.01); *Y02T 90/16* (2013.01)
(58) Field of Classification Search
  USPC .......................................... 320/116, 134, 136
  See application file for complete search history.

(56) References Cited

U.S. PATENT DOCUMENTS

| | | | |
|---|---|---|---|
| 5,952,815 A * | 9/1999 | Rouillard | H02J 7/0016 320/116 |
| 6,320,351 B1 * | 11/2001 | Ng | H02J 7/0032 320/104 |
| 2002/0196000 A1 | 12/2002 | Furukawa | |
| 2006/0119319 A1 * | 6/2006 | Sakurai | H02J 7/0016 320/116 |
| 2007/0120529 A1 * | 5/2007 | Ishikawa | H02J 7/0018 320/119 |
| 2009/0198399 A1 * | 8/2009 | Kubo | B60L 11/1855 701/22 |
| 2010/0156928 A1 * | 6/2010 | Lee | G09G 3/2096 345/589 |
| 2010/0253287 A1 | 10/2010 | Kim et al. | |
| 2011/0025278 A1 * | 2/2011 | Balakrishnan | H02M 1/32 320/166 |
| 2011/0127963 A1 * | 6/2011 | Murao | H02J 7/0016 320/118 |
| 2011/0199051 A1 * | 8/2011 | Shimizu | H02J 7/0016 320/116 |
| 2012/0200271 A1 * | 8/2012 | Henzler | H02M 3/156 323/235 |

FOREIGN PATENT DOCUMENTS

| | | |
|---|---|---|
| JP | 2007-151256 A | 6/2007 |
| JP | 2007-325458 A | 12/2007 |
| JP | 2011-166979 A | 8/2011 |

* cited by examiner

CELL CONTROLLER AND BATTERY-MONITORING DEVICE

TECHNICAL FIELD

The present invention relates to a cell controller and a battery-monitoring device.

BACKGROUND ART

A device known in the related art, which adjusts the charge levels of a plurality of battery cells constituting an assembled battery in order to reduce variance among residual charge levels (cell balancing) and executes charge level adjustment when the assembled battery has not been used over a predetermined length of time (PTL 1).

The battery control system disclosed in PTL 1 comprises a battery control unit that is connected to the assembled battery and includes a CMOS timer IC and a system control unit that includes a microcomputer that receives power provided from a battery other than the assembled battery. The microcomputer calculates the length of time over which the charge level adjustment is to be executed, the length of time thus calculated is transferred to the CMOS timer IC and the charge level adjustment operation starts. Since the battery control unit, to which power is provided from the battery cells constituting the assembled battery, receives the length of time over which the charge level adjustment is to be executed transmitted thereto before the charge level adjustment operation starts, the charge level adjustment operation can be continuously executed even after the power supply to the microcomputer side stops.

CITATION LIST

Patent Literature

PTL 1: Japanese Laid Open Patent Publication No. 2003-282159

SUMMARY OF INVENTION

Technical Problem

In order to ensure that the assembled battery is not over-discharged, the charge level adjustment operation executed for the battery cells constituting the assembled battery needs to be stopped with optimal timing. When a charge level adjustment operation is executed in conjunction with a digital timer such as a CMOS timer IC that is engaged in operation on source power supplied thereto, it may not be possible to stop the charge level adjustment operation with optimal timing in the event of, for instance, a stuck failure, in which a fixed value is output continuously regardless of the input/output signals.

Solution to Problem

According to the first aspect of the present invention, a cell controller in a battery-monitoring device that monitors an assembled battery having a single cell group or a plurality of cell groups, each made up with a plurality of battery cells connected in series, comprises: a startup terminal to which a first discharge resistor is connected and a startup voltage is applied; and a cell-balancing unit that executes cell balancing operation in order to adjust charge levels of the plurality of battery cells during a time period through which the startup voltage remains equal to or greater than a predetermined voltage, wherein: the startup voltage is applied for a predetermined length of time by a first timer unit that includes a passive element capable of accumulating electric energy and capable of discharging electric energy to the startup terminal.

Advantageous Effects of Invention

According to the present invention, the charge level adjustment operation can be stopped with a high level of reliability even in the event of a failure of the first timer unit.

DESCRIPTION OF EMBODIMENTS

First Embodiment

Figure 1:
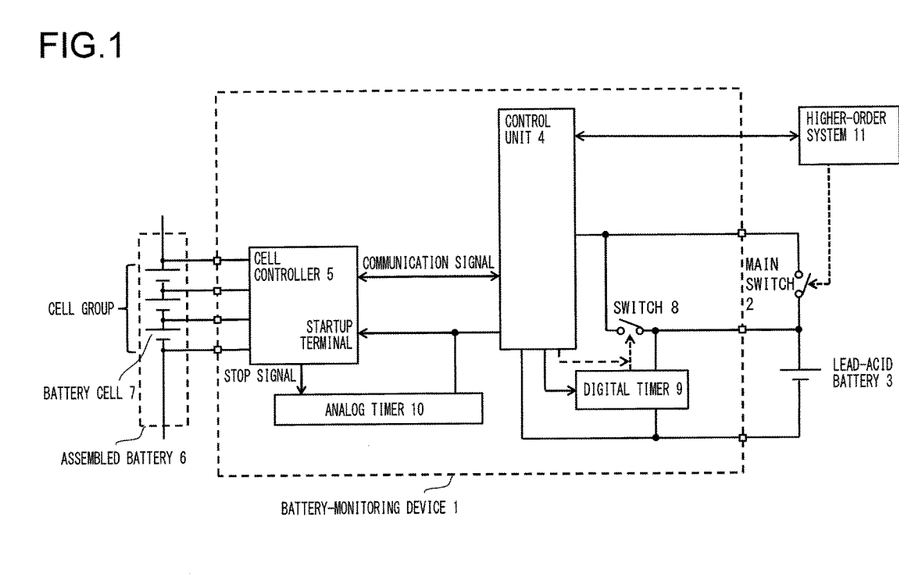
FIG. 1 A diagram showing the structure of a battery-monitoring device achieved in a first embodiment of the present invention FIG. 2 A functional block diagram pertaining to the control unit FIG. 3 A functional block diagram pertaining to a cell controller achieved as another mode of the first embodiment of the present invention FIG. 4 An example of a circuit structure that may be adopted in the analog timer 10

FIG. 1 shows the structure of the battery-monitoring device achieved in the first embodiment of the present invention. The battery-monitoring device 1 shown in FIG. 1 monitors an assembled battery (a battery pack) 6 configured with a cell group made up with a plurality of battery cells 7 connected in series, and is connected to a main switch 2, a lead-acid battery 3, the assembled battery 6 and a higher-order system 11. The battery-monitoring device 1 comprises a control unit 4, a cell controller 5, a switch 8, a digital timer 9 and an analog timer 10. It is to be noted that the battery-monitoring device 1 is installed in a system that drives a motor with power provided from the assembled battery 6, such as a vehicle system in an electric vehicle, a hybrid electric vehicle or the like.

The control unit 4, engaged in execution of specific control processing and arithmetic processing, may be configured with a microcomputer or the like. The control unit 4 assumes, as operation modes thereof, a startup mode, in which it is started up with power provided from the lead-acid battery 3 and a low power consumption mode, in which less power is consumed compared to power consumed in the startup mode.

The cell controller 5 is an integrated circuit installed in correspondence to each cell group included in the assembled battery 6. In the example presented in FIG. 1, the assembled battery 6 includes a single cell group, and thus, only one cell controller 5 is shown in correspondence to the single cell group. The cell controller 5 is connected to the individual battery cells 7 in the corresponding cell group, and power is supplied to the cell controller 5 from the battery cells 7.

The control unit 4 exchanges communication signals with the cell controller 5. A communication signal output from the control unit 4 may carry command information for the cell controller 5. The cell controller 5 executes an operation corresponding to the contents of the command information. Such command information may be, for instance, a voltage measurement command, a cell balancing start command, a cell balancing stop command or a stop command.

The cell controller 5 includes a startup terminal to which a voltage signal from the control unit 4 or the analog timer 10 is input and a GND terminal (not shown) corresponding to the startup terminal. An operation mode switch-over occurs at the cell controller 5 based upon an inter-terminal voltage Va between the startup terminal and the GND terminal. The operation modes assumed at the cell controller 5 include a startup mode and a low power consumption mode.

When the inter-terminal voltage Va is equal to or greater than a predetermined threshold value Vth, the cell controller 5 is set in the startup mode. The cell controller 5 in the startup mode is able to execute the operation corresponding to the command information carried in a communication signal output from the control unit 4, e.g., a voltage measurement or cell balancing for the battery cells 7. If, on the other hand, the inter-terminal voltage Va is less than the threshold value Vth, the cell controller 5 is set in the low power consumption mode. In the low power consumption mode, the operation corresponding to the command information carried in the communication signal output from the control unit 4 is not executed.

The main switch 2, via which power supply to the control unit 4 is controlled, is opened/closed based upon a signal input thereto from the higher-order system 11. When the main switch 2 is in a closed state, power is provided from the lead-acid battery 3 to the control unit 4.

The switch 8, via which the power supply to the control unit 4 is controlled, is closed when a startup sustain signal is output from the control unit 4 or when a startup start signal is output from the digital timer 9. When the switch 8 is in the closed state, power is provided from the lead-acid battery 3 to the control unit 4. The startup sustain signal is output while the control unit 4 remains in the startup mode.

The digital timer 9 is a timer circuit engaged in operation on power provided from the lead-acid battery 3. The digital timer 9 increases a count value d as time elapses. The count value d is reset under control executed by the control unit 4. In addition, the control unit 4 sets a predetermined value Dth at the digital timer 9. As the count value d at the digital timer 9 reaches the predetermined value Dth, the digital timer 9 outputs the startup start signal to the switch 8.

The analog timer 10 is configured with passive elements. The analog timer 10 is capable of applying a voltage equal to or greater than the threshold value Vth to the startup terminal in the cell controller 5 for a predetermined time period T1. The circuit structure of the analog timer 10 will be described in detail later.

The higher-order system 11 executes open/close control for the main switch 2 and exchanges various types of information with the control unit 4 as needed. For instance, information pertaining to the state of the assembled battery 6 is output from the control unit 4 toward the higher-order system 11.

Figure 2:
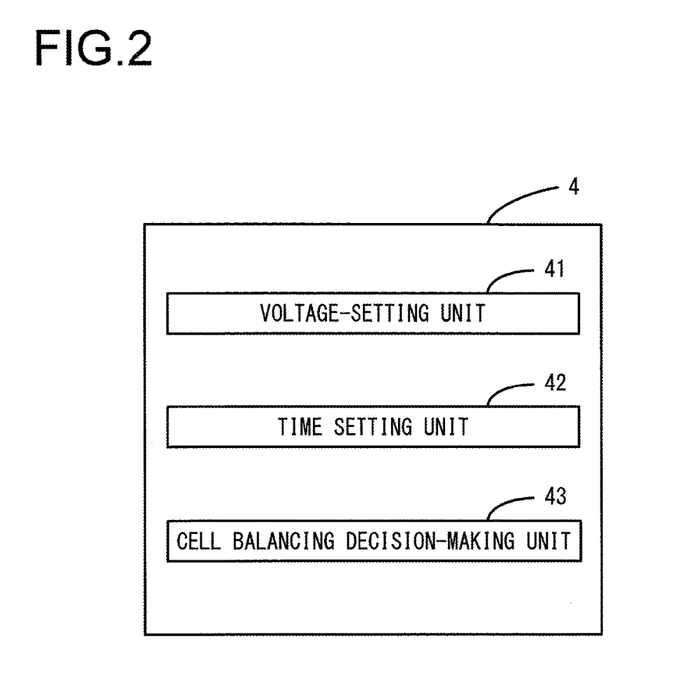

FIG. 2 is a functional block diagram pertaining to the control unit 4. The control unit 4 in FIG. 2 comprises a voltage-setting unit 41, a time setting unit 42 and a cell balancing decision-making unit 43. The voltage-setting unit 41 sets a voltage value for the voltage to be applied to the startup terminal when the control unit 4 is in startup mode.

The time setting unit 42 sets the predetermined value Dth for the digital timer 9. The cell balancing decision-making unit 43 calculates levels of residual (remaining) charge in the plurality of battery cells 7 based upon voltage values measured by the cell controller 5 for the plurality of battery cells 7 and makes a decision as to whether or not cell balancing needs to be executed based upon the calculation results.

Figure 3:
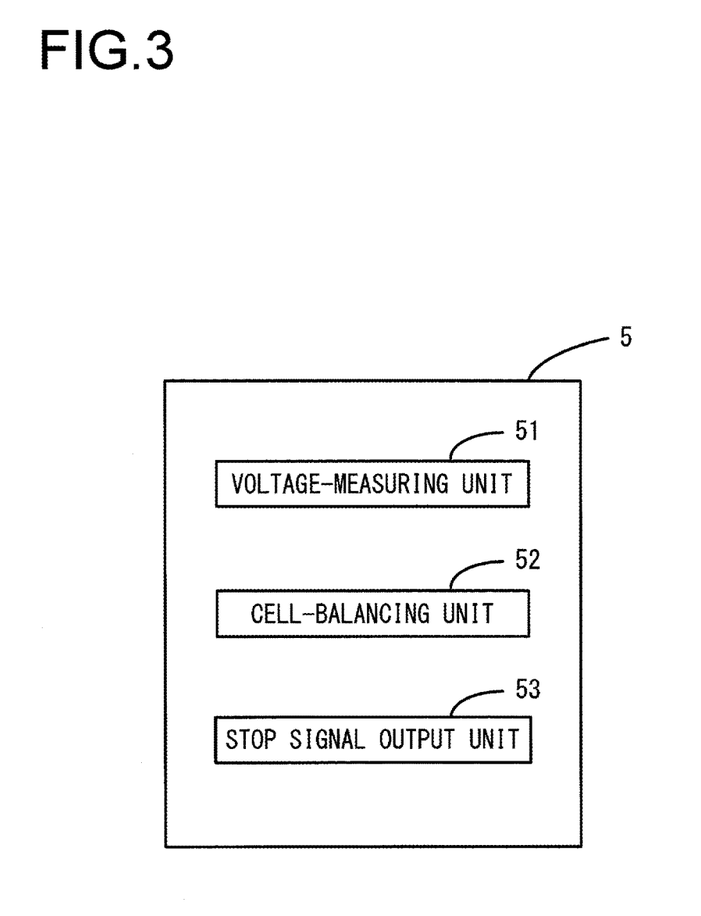

FIG. 3 is a functional block diagram pertaining to the cell controller 5. The cell controller 5 in FIG. 3 comprises a voltage-measuring unit 51, a cell-balancing unit 52 and a stop signal output unit 53. The voltage-measuring unit 51 measures the voltages at the plurality of battery cells 7 in the cell group and outputs a communication signal indicating the measurement results to the control unit 4. The voltage-measuring unit 51 is engaged in operation as the control unit 4 outputs a communication signal carrying a voltage measurement command to the cell controller 5.

The cell-balancing unit 52 executes cell balancing by adjusting the residual charge levels in the individual battery cells 7 constituting the cell group. The cell balancing operation executed by the cell-balancing unit 52 starts in response to a communication signal including a cell balancing start command, issued by the control unit 4 and input to the cell controller 5, and ends in response to a communication signal including a cell balancing stop command, issued by the control unit 4 and input to the cell controller 5.

The stop signal output unit 53 outputs a stop signal to a circuit that controls the analog timer 10, in response to a communication signal including a stop command, issued by the control unit 4 and input to the cell controller 5.

Figure 4:
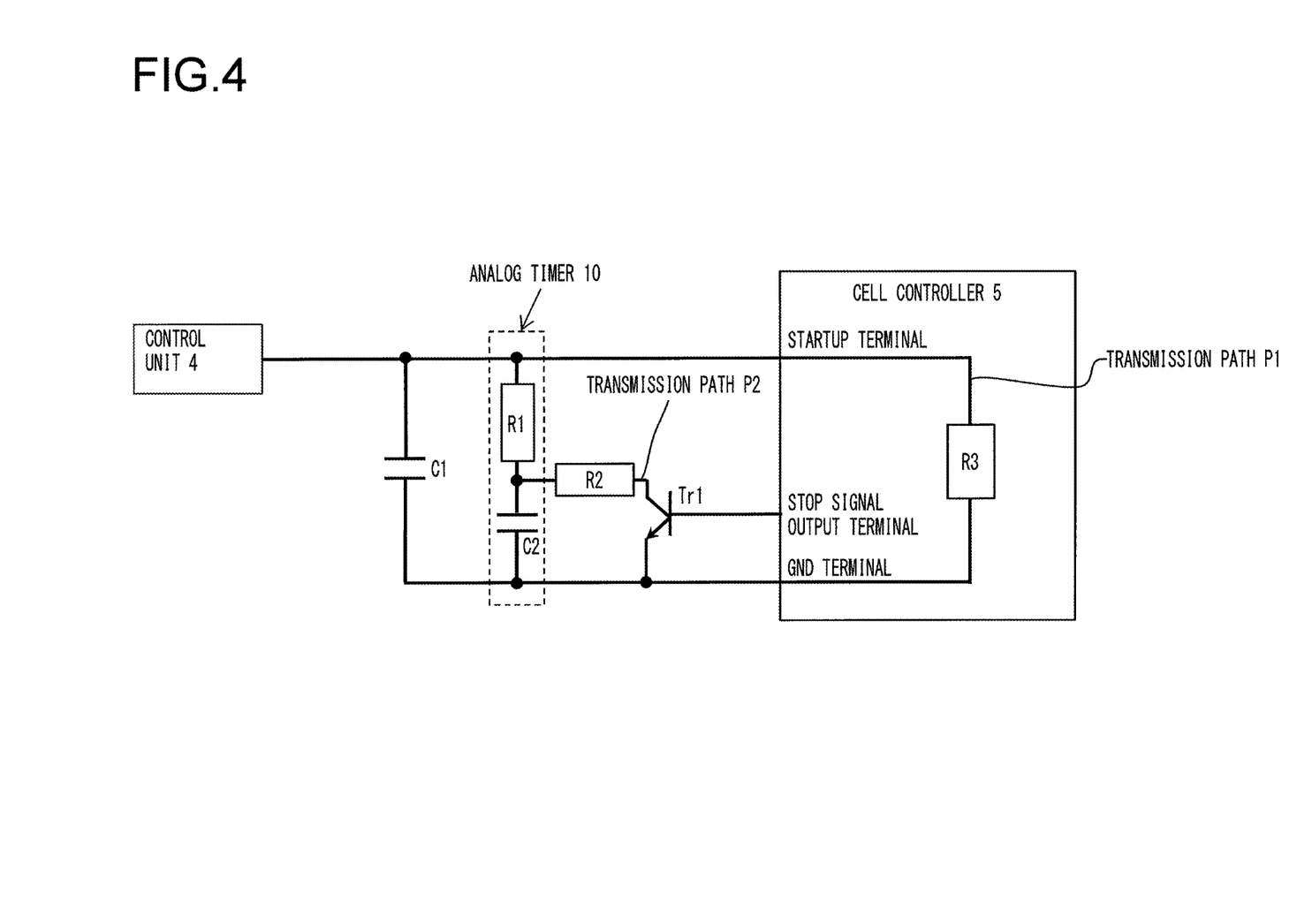

FIG. 4 presents an example of a circuit structure that may be adopted in the analog timer 10. FIG. 4 shows a circuit configuring the analog timer 10, the control unit 4, the cell controller 5, a capacitor C1 that stabilizes a startup signal, a discharge resistor R2 and a transistor Tr1.

The terminals at the cell controller 5 in FIG. 4 include the startup terminal, the GND terminal and a stop signal output terminal. The inter-terminal voltage Va is input between the startup terminal and the GND terminal. The cell controller 5 includes a transmission path P1 with a discharge resistor R3 installed thereat, located between the start up terminal and the GND terminal, and a startup signal is transmitted based upon the inter-terminal voltage Va. Through the stop signal output terminal, the stop signal output unit 53 in FIG. 3 outputs a stop signal.

The analog timer 10 at least includes a capacitor C2. The analog timer 10 in FIG. 4 is configured as a circuit achieved by connecting a resistor R1 and the capacitor C2 in series. The analog timer 10 is installed outside the cell controller 5 so as to connect the startup terminal and the GND terminal. One of the electrodes at the resistor R1 is electrically connected to the startup terminal, whereas the other electrode at the resistor R1 is connected to the discharge resistor R2 and the capacitor C2. The electrode at the capacitor C2, which is not connected with the resistor R1, is electrically connected to the GND terminal.

Electric energy is accumulated in the capacitor C2 based upon the inter-terminal voltage Va. As the control unit 4 shifts into the low power consumption mode, the capacitor C2 discharges the electric energy having been accumulated therein toward the startup terminal with a time constant $c2\times(r1+r3)$ via the resistor R1 and the transmission path P1. c2, r1 and r3 in the time constant respectively represent the capacitance of the capacitor C2, the resistance value of the resistor R1 and the resistance value of the discharge resistor R3. As the electric energy is thus discharged, the inter-terminal voltage Va remains at a level equal to or greater than the threshold value Vth for a time length T1. This time length T1 is determined based upon the amount of electric energy accumulated in the capacitor C2. The electric energy accumulated in the capacitor C2 is determined based upon the level of voltage applied by the control unit 4 in the startup mode, i.e., the voltage value set by the voltage-setting unit 41.

One of the electrodes of the discharge resistor R2 is connected to the resistor R1 and the capacitor C2. The other electrode of the discharge resistor R2 is connected to the collector of the transistor Tr1. The base of the transistor Tr1 is connected to the stop signal output terminal in the cell controller 5. The emitter of the transistor Tr1 is electrically connected to the GND terminal in the cell controller 5.

As a stop signal is output through the stop signal output terminal in the cell controller 5, the transistor Tr1 enters an ON state. Once the transistor Tr1 enters the ON state, a transmission path P2, passing through the discharge resistor R2, and the transistor Tr1 between its collector and emitter, is formed, and through this transmission path P2, the electric energy accumulated in the capacitor C2 is discharged.

It is desirable that the resistance values at the various resistors be set so that the resistance value of the discharge resistor R3 is the greatest and that the resistance value of the resistor R1 is greater than that of the discharge resistor R2. In addition, it is desirable that the capacitance of the capacitor C2 be greater than the capacitance of the capacitor C1.

Figure 5:
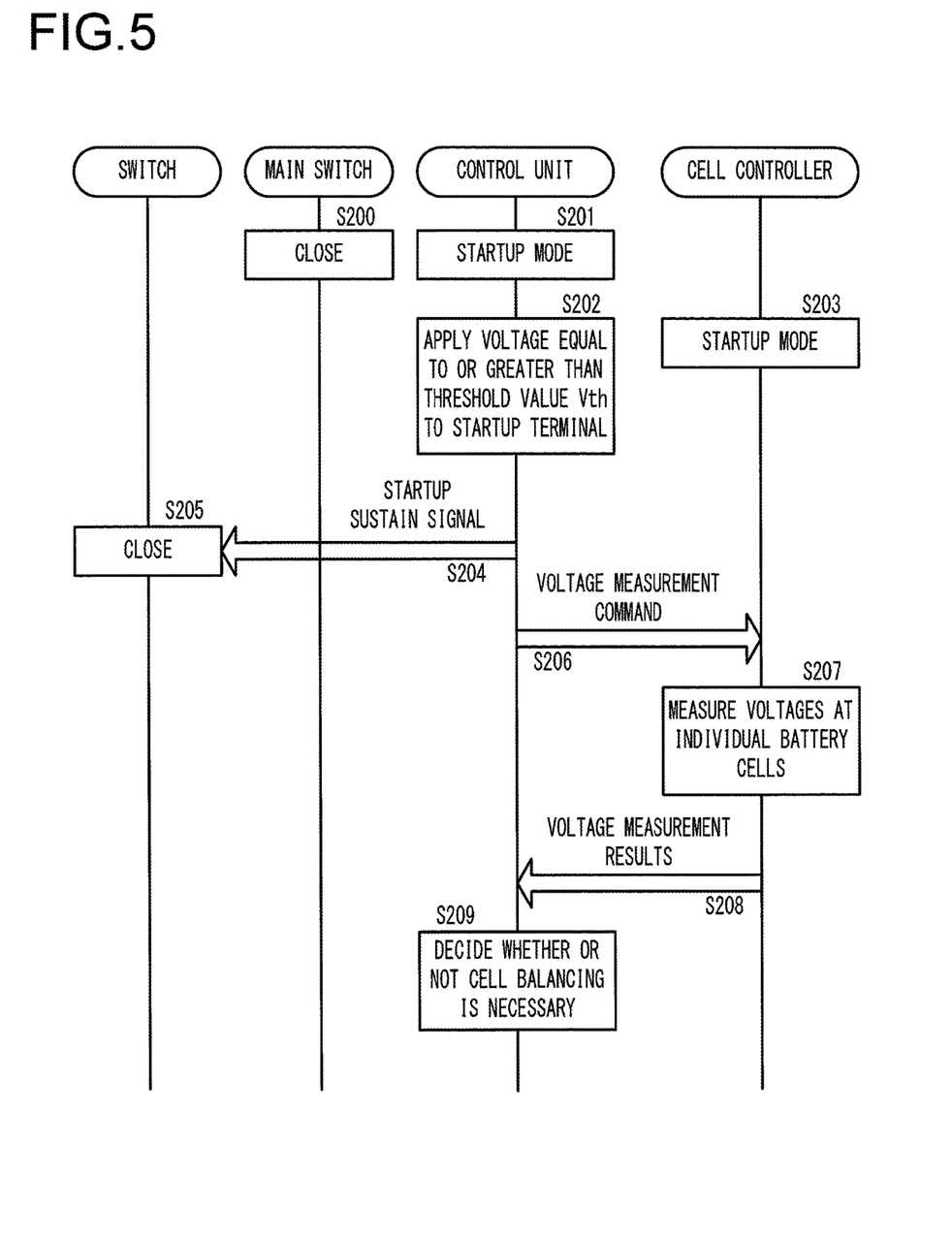
FIG. 5 A sequence chart in reference to which the operation executed in the battery-monitoring device in the first embodiment of the present invention will be explained FIG. 6 A sequence chart in reference to which the operation executed in the battery-monitoring device in the first embodiment of the present invention will be explained FIG. 7 A sequence chart in reference to which the operation executed in the battery-monitoring device in the first embodiment of the present invention will be explained FIG. 8 A sequence chart in reference to which the operation executed in the battery-monitoring device in the first embodiment of the present invention will be explained FIG. 9 A sequence chart in reference to which the operation executed in the battery-monitoring device in the first embodiment of the present invention will be explained FIG. 10 A sequence chart in reference to which the operation executed in the battery-monitoring device in the first embodiment of the present invention will be explained FIG. 11 A diagram showing the structure of a battery-monitoring device achieved in a second embodiment of the present invention FIG. 12 An example of a circuit structure that may be adopted for the cell controller in the second embodiment of the present invention

In reference to the sequence chart in FIG. 5, the operations of various units, executed as the battery-monitoring device 1 starts its operation, will be described. The operational procedure shown in FIG. 5 starts under conditions in which the control unit 4 and the cell controller 5 are both in the low power consumption mode and the main switch 2 and the switch 8 are both in the open state.

In step S200, the main switch 2 is closed in response to a signal input from the higher-order system 11. As a result, power from the lead-acid battery 3 is provided to the control unit 4. The control unit 4 having received the power provided thereto from the lead-acid battery 3 shifts into the startup mode in step S201.

In step S202, the control unit 4 applies a voltage equal to or greater than the threshold value Vth to the startup terminal at the cell controller 5. As a result, the cell controller 5 shifts into the startup mode in step S203. In step S204, the control unit 4 starts outputting a startup sustain signal to the switch 8. In response to the startup sustain signal input thereto, the switch 8 enters a closed state in step S205.

In step S206, the control unit 4 outputs a communication signal carrying a voltage measurement command to the cell controller 5. In step S207, the cell controller 5 engages the voltage-measuring unit 51 in operation so as to measure the voltages at the plurality of battery cells 7 included in the cell group corresponding to the cell controller 5. In step S208, the cell controller 5 outputs a communication signal containing the voltage measurement results to the control unit 4. In step S209, the control unit 4 calculates the residual charges in the plurality of battery cells 7 based upon the voltage measurement results and makes a decision, through the processing executed by the cell balancing decision-making unit 43, as to whether or not cell balancing needs to be executed.

Figure 6:
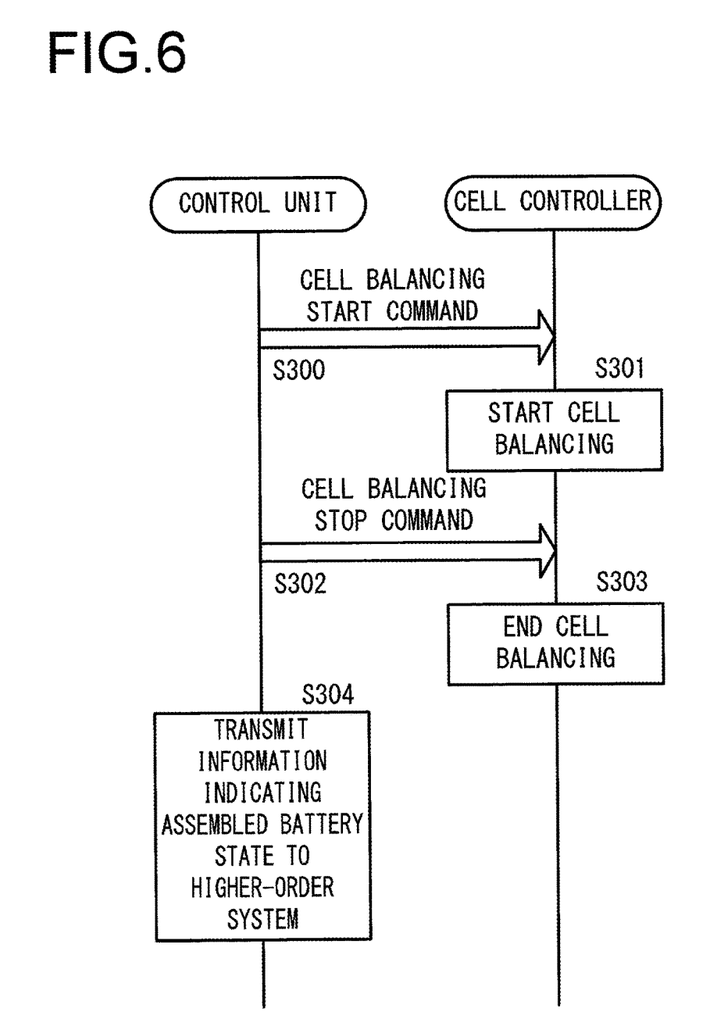

The operation executed by the battery-monitoring device 1 when it is decided in step S209 that cell balancing needs to be executed will be described in reference to FIG. 6. The operational procedure shown in FIG. 6 starts under conditions in which the control unit 4 and the cell controller 5 are in the startup mode and the main switch 2 and the switch 8 are both closed.

In step S300, the control unit 4 outputs a communication signal carrying a cell balancing start command to the cell controller 5. In step S301, the cell controller 5 starts cell balancing via the cell-balancing unit 52.

Based upon the residual charges in the plurality of battery cells 7 in the cell group requiring cell balancing, the control unit 4 calculates the length of time required for the cell balancing operation. When the required length of time has elapsed, the control unit 4 outputs a cell balancing stop command in step S302. In response to the cell balancing stop command, the cell controller 5 ends the cell balancing operation in step S303. In step S304, the control unit 4 outputs various types of information indicating, for instance, the state of the assembled battery 6, to the higher-order system 11.

In reference to FIG. 7, the operations executed in the various units when the battery-monitoring device 1 ends its operation will be described. The operational procedure shown in FIG. 7 starts under conditions in which the control unit 4 and the cell controller 5 are both in the startup mode and the main switch 2 and the switch 8 are both closed.

In step S400, the main switch 2 opens in response to a signal input thereto from the higher-order system 11. Once the main switch 2 enters the open state, the control unit 4 starts executing control for shifting from the startup mode into the low power consumption mode. In step S401, the control unit 4 stops the voltage application to the startup terminal. At this point, the startup terminal at the control unit 4 enters a high impedance state. When the electric energy accumulated in the capacitor C2 at the analog timer 10 is discharged via the resistor R1 and the discharge resistor R3, the cell controller 5 shifts into the low power consumption mode in step S402.

In step S403, the control unit 4 issues a reset command for the digital timer 9, prompting it to reset the count value d, and also sets the predetermined value Dth via the time setting unit 42. In step S404, the digital timer 9 resets the timer count value d and starts a count.

In step S405, the control unit 4 stops outputting the startup sustain signal. As a result, the switch 8 opens in step S406, thereby stopping the power supply from the lead-acid battery 3 to the control unit 4. The control unit 4 thus shifts from the startup mode into the low power consumption mode in step S407. It is to be noted that the digital timer 9, continuously receiving power from the lead-acid battery 3, continues the count.

Figure 7:
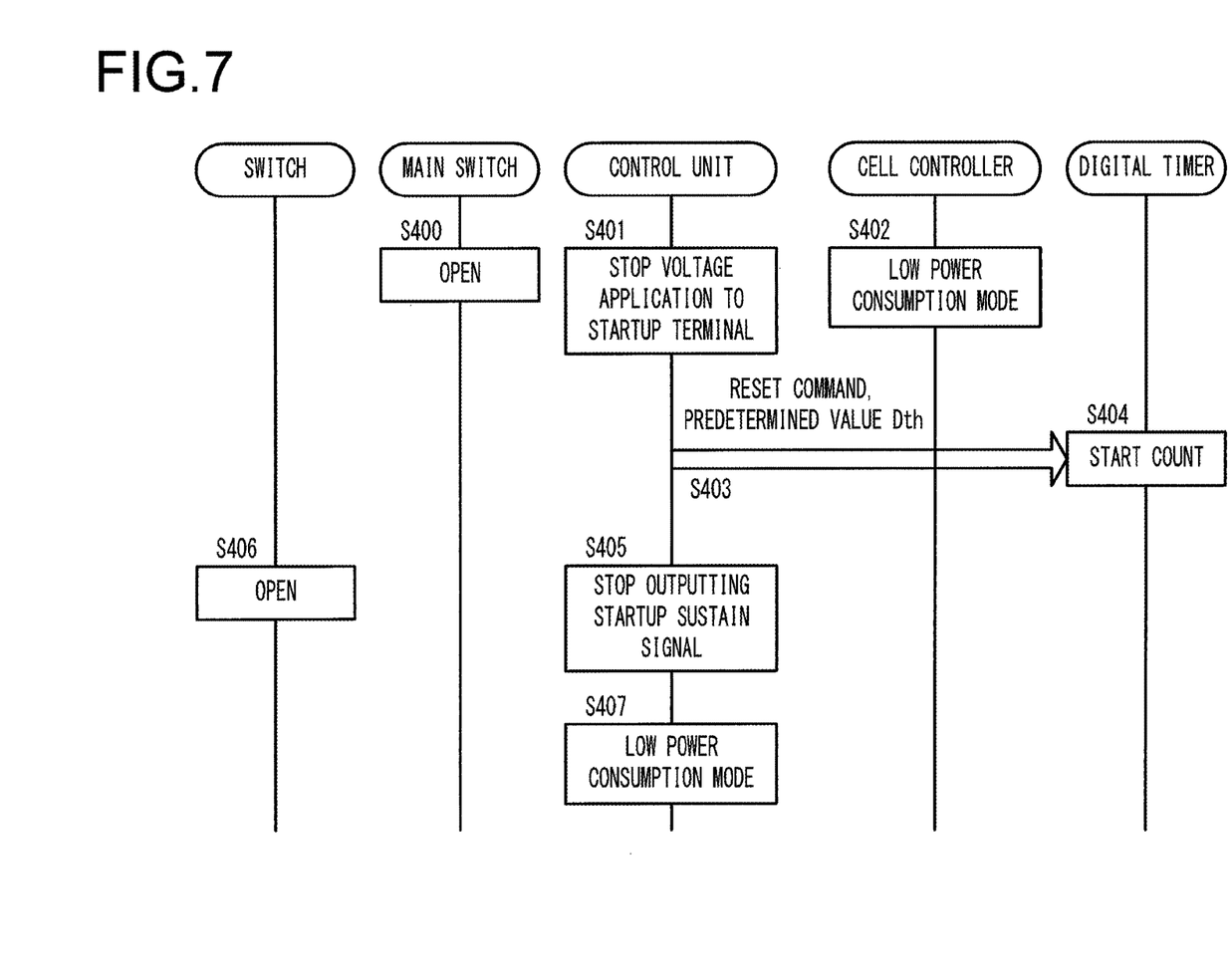

When the operation shown in FIG. 7 is completed, the control unit 4 and the cell controller 5 are in the low power consumption mode. Namely, at the completion of the operation, the assembled battery 6 is not in use. Even when the battery cells 7 are not being used, the residual charges in the battery cells 7 constituting the assembled battery 6 decrease through self-discharge. In this situation, the residual charges remaining in the individual battery cells 7 may not be uniform due to a variance among the self-discharge rates of the individual battery cells 7. When the count value d at the digital timer 9 reaches the predetermined value Dth, the battery-monitoring device 1 switches the cell controller 5 into the startup mode so as to make a decision, via the cell balancing decision-making unit 43, as to whether or not cell balancing needs to be executed, and executes cell balancing if there is a variance among the residual charges.

Figure 8:
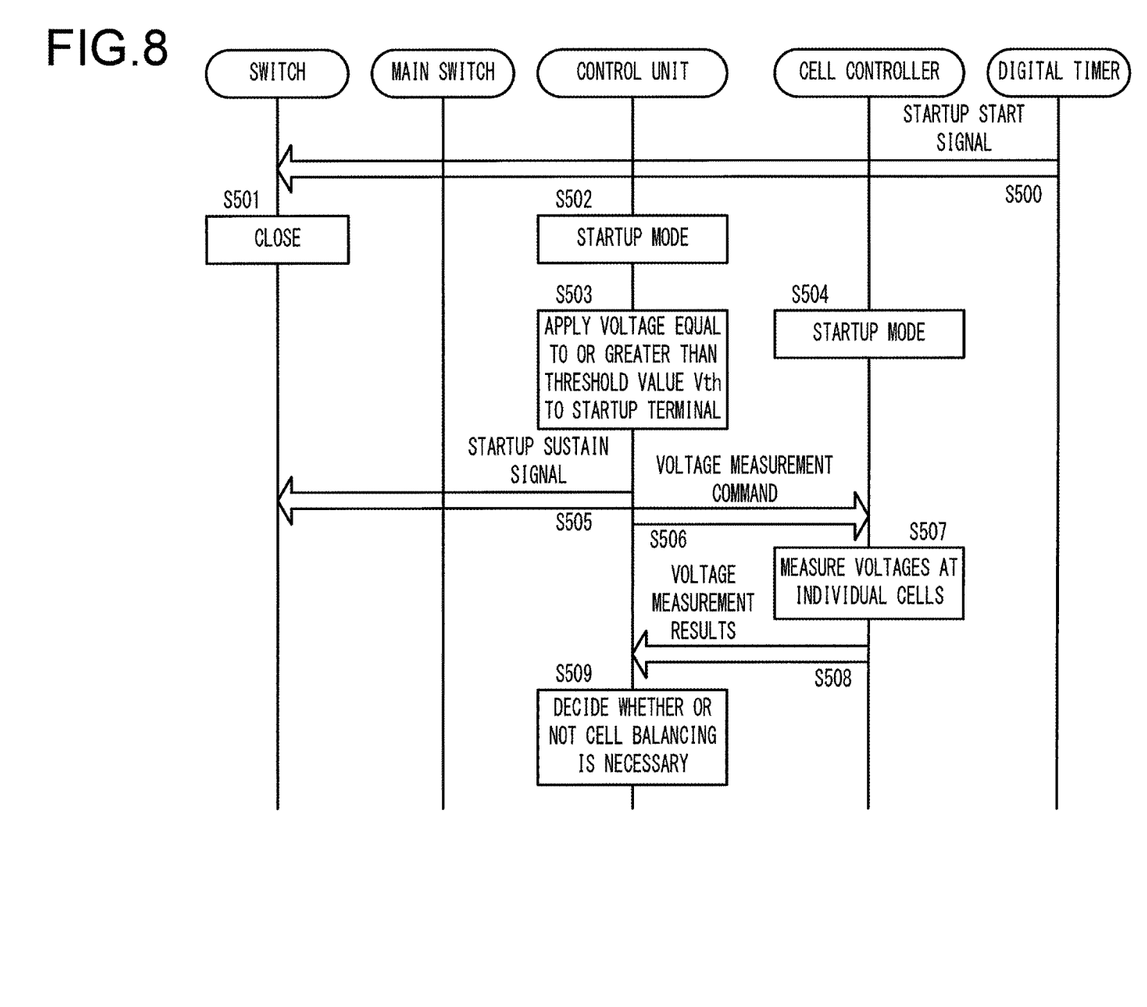

FIG. 8 shows the operation of the battery-monitoring device 1, which starts when the count value d at the digital timer 9 reaches the predetermined value Dth. When the operational procedure shown in FIG. 8 starts, the control unit 4 is in the low power consumption mode, the cell controller 5 is in the low power consumption mode, and the main switch 2 and the switch 8 are both in the open state.

In step S500, the digital timer 9 outputs a startup start signal to the switch 8. In step S501, the switch 8 closes in response to the startup start signal so as to start power supply from the lead-acid battery 3 to the control unit 4. As a result, the control unit 4 shifts into the startup mode in step S502. In step S503, the control unit 4 applies a voltage equal to or greater than the threshold value Vth to the startup terminal at the cell controller 5. The cell controller 5 is thus caused to shift into the startup mode in step S504. In step S505, the control unit 4 starts outputting a startup sustain signal to the switch 8.

In step S506, the control unit 4 outputs a communication signal carrying a voltage measurement command to the cell controller 5. In step S507, the cell controller 5 engages the voltage-measuring unit 51 in operation and thus measures the voltages at the plurality of battery cells 7 included in the cell group corresponding to the particular cell controller 5. In step S508, the cell controller 5 outputs a communication signal carrying the voltage measurement results to the control unit 4. In step S509, the control unit 4 calculates the levels of residual charge in the plurality of battery cells 7 based upon the voltage measurement results and makes a decision, through processing executed by the cell balancing decision-making unit 43, as to whether or not cell balancing needs to be executed.

Figure 9:
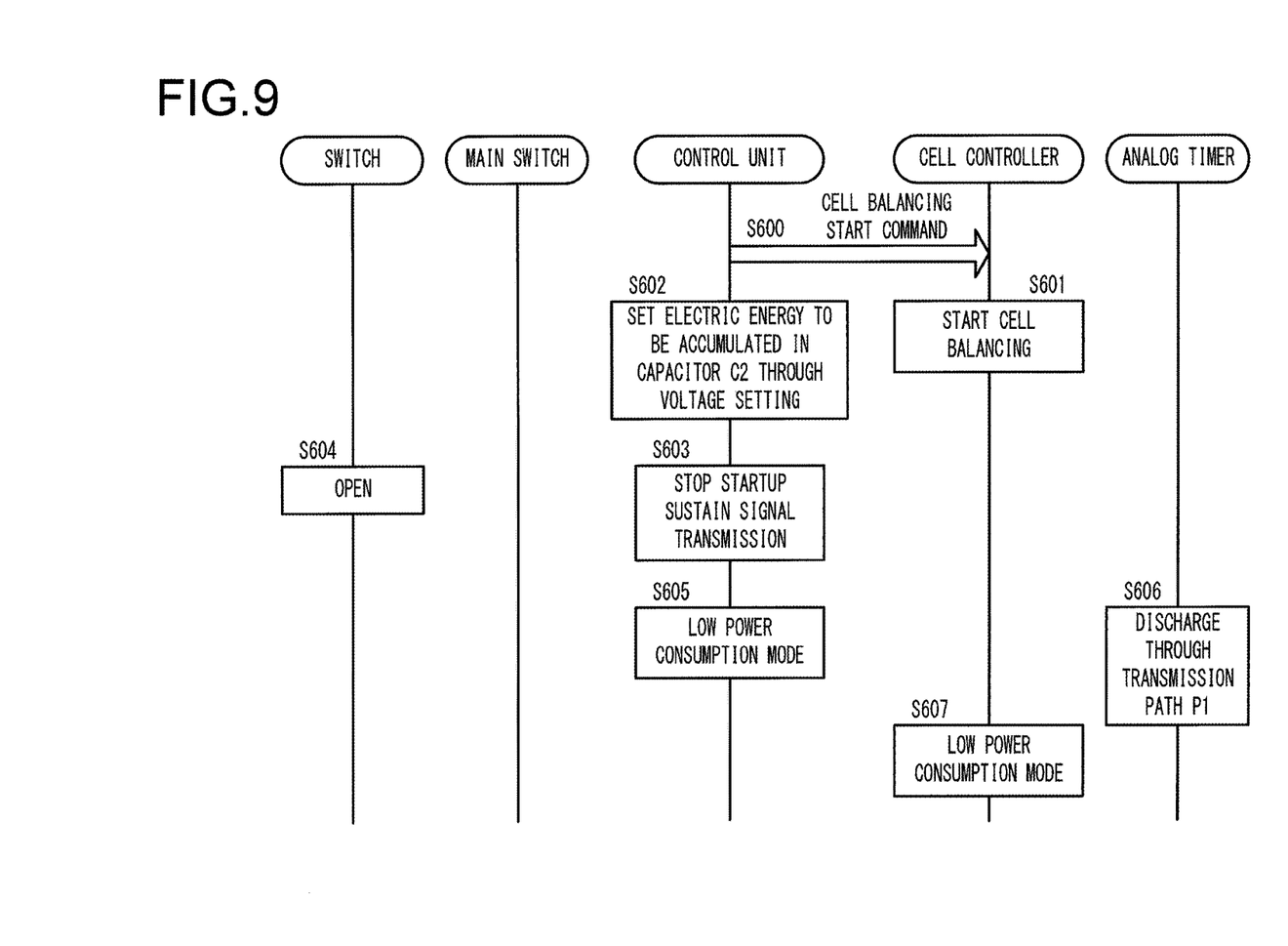

The operation executed by the battery-monitoring device 1 when it is decided in step S509 that cell balancing needs to be executed will be described in reference to FIG. 9. The operational procedure shown in FIG. 9 starts under conditions in which the control unit 4 and the cell controller 5 are in the startup mode, the main switch 2 is open and the switch 8 is closed.

In step S600, the control unit 4 outputs a communication signal carrying a cell balancing start command to the cell controller 5. In step S601, the cell controller 5 starts cell balancing via the cell-balancing unit 52. In addition, in step S602, the control unit 4 sets the level of electric energy to be accumulated at the capacitor C2 by setting, via the voltage-setting unit 41, the voltage to be applied to the startup terminal.

In step S603, the control unit 4 stops outputting the startup sustain signal. As a result, the switch 8 opens in step S604, thereby stopping the power supply from the lead-acid battery 3 to the control unit 4. The control unit 4 thus shifts from the startup mode into the low power consumption mode in step S605. Consequently, the voltage application to the startup terminal by the control unit 4 stops and the startup terminal at the control unit 4 enters a high impedance state.

At this time, the capacitor C2 in the analog timer 10 starts a discharge via the transmission path P1 in step S606. Through the discharge via the capacitor C2, the inter-terminal voltage Va is sustained at a level equal to or greater than the threshold value Vth during the time period T1, the length of which is determined based upon the amount of electric energy accumulated at the capacitor C2 and the time constant c2×(r1+r3). While the inter-terminal voltage Va is sustained at a level equal to or greater than the threshold value Vth through the discharge at the capacitor C2, the cell controller 5 completes the cell balancing operation. Once the inter-terminal voltage Va becomes less than the threshold value Vth, the cell controller 5 shifts into the low power consumption mode (step S607).

The analog timer 10 may enter a failure mode when the capacitor C2 or the resistor R1 is short-circuited or is opened. Even if the capacitor C2 or the resistor R1 is opened or short-circuited, the voltage output from the analog timer 10 is lowered to a level less than the threshold value once the control unit 4 stops applying the startup voltage to the controller 5. Namely, once the control unit 4 stops the voltage application to the startup terminal in the cell controller 5, the cell controller 5 shifts into the low power consumption mode and the cell balancing operation executed via the cell-balancing unit 52 ends. This means that even in the event of a failure in the analog timer 10, a shift into the low power consumption mode is enabled. In addition, since the cell controller 5 has a function of ending cell balancing when it shifts into the low power consumption mode, the cell balancing operation can be terminated.

The operation executed by the battery-monitoring device 1 when it is decided in step S509 in FIG. 8 that cell balancing does not need to be executed will be described in reference to FIG. 10. The operational procedure shown in FIG. 10 starts under conditions in which the control unit 4 and the cell controller 5 are in the startup mode, the main switch 2 is open and the switch 8 is closed.

Figure 10:
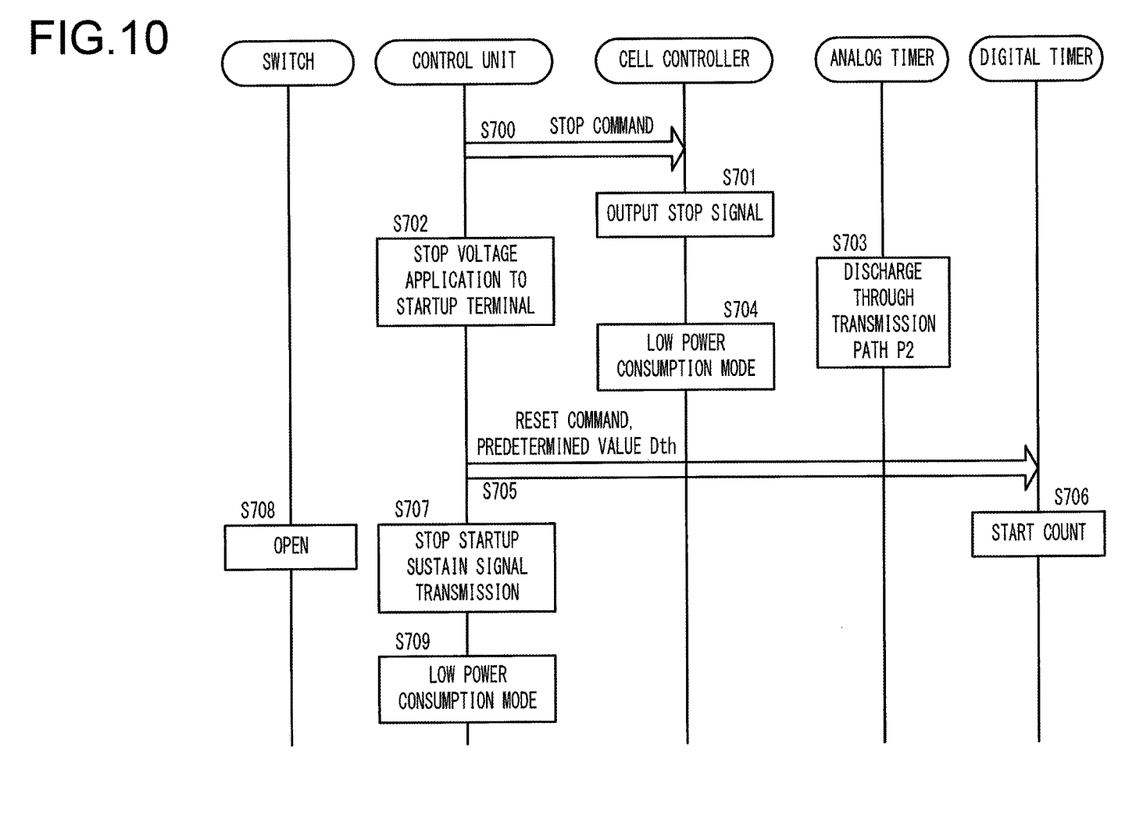

In step S700 in FIG. 10, the control unit 4 transmits a communication signal carrying a stop command to the cell controller 5. In step S701, the cell controller 5 outputs a stop signal. As the stop signal is input to the base of the transistor Tr1, the transistor Tr1 enters an ON state.

In step S702, the control unit 4 stops the voltage application to the startup terminal by the control unit 4 and thus, the startup terminal at the control unit 4 enters a high impedance state. In step S703, the capacitor C2 in the analog timer 10 discharges the electric energy accumulated therein via the transmission path P2. In step S704, the cell controller 5 shifts into the low power consumption mode. In step S705, the control unit 4 issues a reset command to the digital timer 9 so as to reset the count value d and also sets the predetermined value Dth via the time setting unit 42. In step S706, the digital timer 9 resets the count value d and starts a count. In step S707, the control unit 4 stops outputting the startup sustain signal. As a result, the switch 8 opens in step S708, thereby stopping the power supply from the lead-acid battery 3 to the control unit 4. The control unit 4 thus shifts from the startup mode into the low power consumption mode in step S709.

The first embodiment of the present invention described above achieves the following advantages.

The cell controller 5 in the battery-monitoring device 1, which monitors a assembled battery having a cell group made up with a plurality of battery cells 7 connected in series, includes a startup terminal that is connected with the discharge resistor R3 and a cell-balancing unit 52 that executes cell balancing in order to adjust the charge levels of the plurality of battery cells 7 while the inter-terminal voltage Va remains equal to or greater than the threshold value Vth. Through a discharge via the analog timer 10, which includes the capacitor C2 capable of accumulating electric energy and discharging electric energy to the startup terminal, the inter-terminal voltage Va is sustained at a level equal to or greater than the threshold value Vth for the time period T1. Once the control unit 4 stops the application of the startup voltage to the cell controller 5, the voltage output from the analog timer 10 is lowered to a level less than the threshold value Vth even if the analog timer 10 is in a short-circuited or open state and thus, the cell balancing operation at the cell controller 5 can be stopped even under such circumstances.

The control unit 4 sets, via the voltage-setting unit 41, a voltage to be applied to the startup terminal in the startup mode. The length of the time period T1 for which the inter-terminal voltage Va remains equal to or greater than the threshold value Vth through discharge at the capacitor C2 changes in correspondence to the voltage set by the voltage-setting unit 41. By utilizing a setting means such as the voltage-setting unit 41, the time length T1 can be set using passive elements alone, such as the resistor R1 and the capacitor C1.

Second Embodiment

Figure 11:
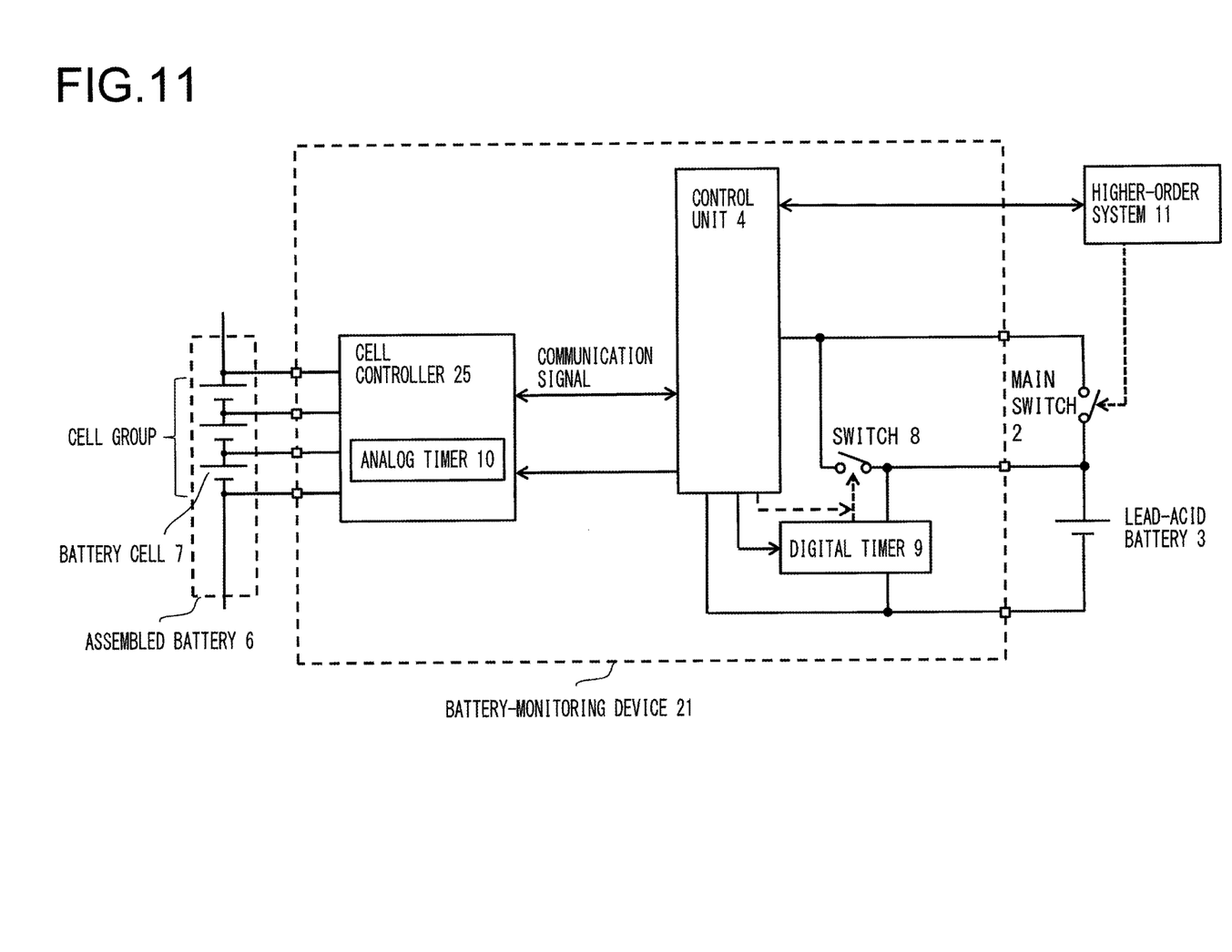

The second embodiment of the present invention will be described next. The battery-monitoring device 1 achieved in the first embodiment includes the analog timer 10 installed outside the cell controller 5. FIG. 11 shows the structure of a battery-monitoring device 21 achieved in the second embodiment. The battery-monitoring device 21 is distinguishable from that achieved in the first embodiment in that the analog timer 10 is built into its cell controller. It is to be noted that since the operation of the battery-monitoring device 21 achieved in the second embodiment is similar to that of the battery-monitoring device 1 in the first embodiment, a repeated explanation will not be provided.

Figure 12:
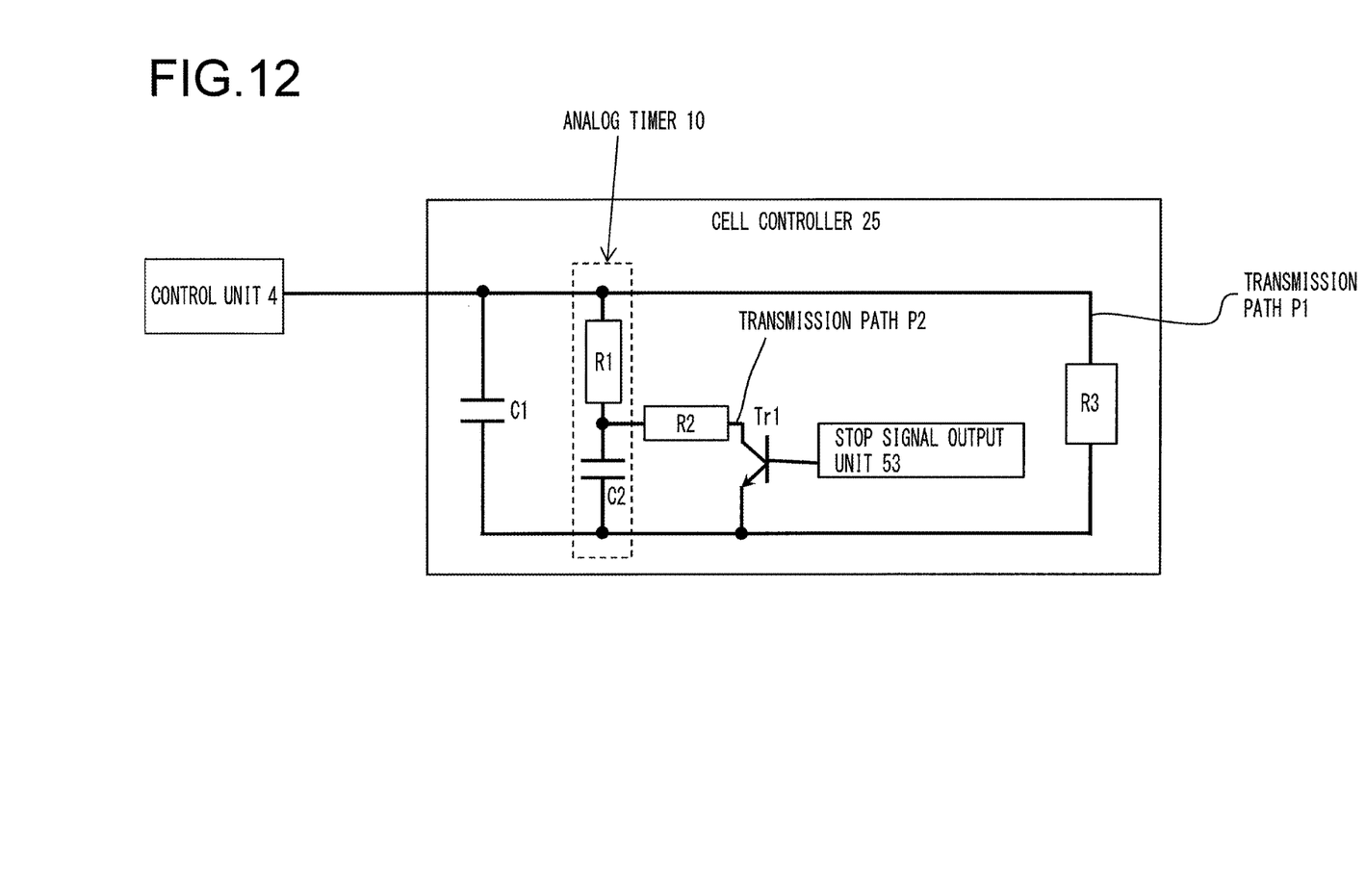

FIG. 12 shows the circuit pertaining to the analog timer 10 in the circuit structure assumed in a cell controller 25. As FIG. 12 shows, the cell controller 25 further includes the analog timer 10, the capacitor C1, the discharge resistor R2 and the transistor Tr1, in addition to the discharge resistor R3 included in the cell controller 5.

The second embodiment of the present invention described above achieves the following advantages.

The cell controller 25 in the battery-monitoring device 1, which monitors an assembled battery having a cell group made up with a plurality of battery cells 7 connected in series, includes a startup terminal that is connected with the discharge resistor R3 and a cell-balancing unit 52 that executes cell balancing in order to adjust the charge levels of the plurality of battery cells 7 while the inter-terminal voltage Va remains equal to or greater than the threshold value Vth. Through a discharge via the analog timer 10, which includes the capacitor C2 capable of accumulating electric energy and discharging electric energy to the startup terminal, the inter-terminal voltage Va is sustained at a level equal to or greater than the threshold value Vth for the time period T1. Even when a failure occurs in the capacitor C2 resulting in short-circuit or opening of the analog timer 10, the analog timer 10 does not output a voltage equal to or greater than the threshold value Vth and thus, the cell balancing operation can be stopped.

The embodiments described above allow for the following variations.

While the analog timer 10 in the first and second embodiments described above is a serial circuit configured with the resistor R1 and capacitor C2, it may adopt a circuit structure constituted with the capacitor C2 alone. In other words, the resistor R1 in the analog timer 10 may be modified into a shorting circuit. While the length of time to elapse before the cell controller 5 enters the startup mode in step S203 in FIG. 5 increases in conjunction with an analog timer that does not include the resistor R1, the reduction in the number of parts constituting the analog timer 10 will lower the manufacturing cost of the battery-monitoring device. It is to be noted that when the analog timer does not include the resistor R1, the time constant at which electric energy is discharged from the capacitor C2 via the discharge resistor R3 is c2×r3.

The analog timer 10 may be configured with a passive element other than the capacitor C2, as long as it is capable of accumulating and discharging electric energy. For instance, a variable capacitor may be utilized instead of the capacitor C2. In such a case, the time setting unit 42 may select a capacitance of the variable capacitor in order to set the time length T1. When the analog timer 10 is included in the cell controller 25 as in the second embodiment, a communication signal carrying a capacitance value setting and an adjust command may be output to the cell controller 25 from the time setting unit 42 in the control unit 4 in order to have the time length T1 adjusted by the cell controller 25.

The control unit 4 does not need to have the function of the cell balancing decision-making unit 43. For instance, instead of the control unit 4, the higher-order system 11 may include the cell balancing decision-making unit 43. In such a case, it is desirable that the control unit 4 transmits a communication signal carrying the voltage measurement results output from the cell controller 5 or 25 or information including the voltage measurement results to the higher-order system 11.

In either the first or second embodiment, the battery-monitoring device 1 or 21 monitors the assembled battery 6 constituted with a single cell group made up with a plurality of battery cells 7 connected in series. However, the assembled battery to be monitored by the battery-monitoring device according to the present invention may adopt a structure other than this. An assembled battery constituted with a plurality of cell groups each made up with a plurality of battery cells connected in series may instead be monitored by the battery-monitoring device according to the present invention. It is to be noted that the battery-monitoring device used to monitor an assembled battery constituted with a plurality of cell groups are desirable to include cell controllers in a quantity matching the number of cell groups in the assembled battery so that the cell groups are each controlled via one of the cell controllers. In addition, the plurality of cell controllers may be connected in a daisy chain. It is to be further noted that the voltage to be applied to the startup terminal and the analog timer 10 at a cell controller may be provided by another cell controller. Furthermore, the discharge resistor R3 does not need to be a resistor specially formed within the cell controller 5 and instead, a leak resistance may be used as the discharge resistor. Moreover, the discharge resistor R3 may be disposed outside the cell controller 5.

A digital timer may be utilized in addition to the analog timer 10 to control the time length T1 starting from a shift into the low power consumption mode at the control unit 4 until a time when the cell controller 5 or 25 is made to shift into the low power consumption mode. In addition, the present invention may be adopted in conjunction with a plurality of digital timers. By using a digital timer in conjunction with the analog timer 10, the time length T1 can be set to a greater value.

It is to be noted that the embodiments and variations thereof described above simply represent examples and the present invention is in no way limited to these examples as long as the features characterizing the present invention remain intact.

The invention claimed is:

1. A battery-monitoring device that monitors an assembled battery having a single cell group or a plurality of cell groups, each made up with a plurality of battery cells connected in series, comprising:
   a cell controller;
   a control unit that applies a startup voltage to the cell controller and is electrically connected to a battery via a first switch;
   a first timer unit that includes a passive element capable of accumulating/discharging electric energy; and
   a second timer unit communicatively coupled to the control unit and electrically coupled to the battery, wherein the second timer unit continuously receives power from the battery;
   wherein the cell controller:
   in response to receiving the startup voltage, adjusts charge levels of the plurality of battery cells during a time period through which the startup voltage remains equal to or greater than a predetermined voltage,
   receives an input signal input from a higher-order system, and
   in response to receiving the input signal, enters a low power consumption mode;
   wherein, in response to entering the low power consumption mode, the control unit:
   activates the first timer,
   issues a reset command for the second timer,
   does not apply the startup voltage equal to or greater than the predetermined voltage to the cell controller, and
   disconnects the control unit from the battery by opening the switch;
   wherein the first timer unit in response to the control unit entering the low power consumption mode:
   applies the startup voltage equal to or greater than the predetermined voltage to the cell controller for a predetermined length of time.

2. The battery-monitoring device according to claim 1, wherein:
   the passive element included in the first timer unit is a capacitor; and
   the electric energy accumulated in the capacitor is discharged to the cell controller at a time constant determined based upon a capacitance of the capacitor.

3. The battery-monitoring device according to claim 1, wherein:
   the first timer unit is built into the cell controller.

4. The battery-monitoring device according to claim 1, wherein:
   the predetermined length of time is changed in correspondence to a voltage value of the startup voltage applied by the control unit to the cell controller.

5. The battery-monitoring device according to claim 4, wherein:
   the control unit further sets a voltage value for the startup voltage to be applied to the cell controller.

6. The battery-monitoring device according to claim 4, wherein the second timer unit counts a length of time elapsing after the control unit enters into the low power consumption mode and starts up the control unit from the low power consumption mode when the length of elapsing time becomes equal to a specific time length.

7. The battery-monitoring device according to claim 6, wherein:
   the cell controller further:
   measures voltages of the plurality of battery cells during the time period through which the startup voltage remains equal to or greater than the predetermined voltage, and
   selectively performs cell balancing based upon voltage measurement results
   after the control unit is started up from the low power consumption mode by the second timer unit.

8. The battery-monitoring device according to claim 7, wherein:
   the cell controller further closes a transmission path used to discharge the electric energy accumulated in the passive element, in response to cell balancing not being performed.

* * * * *